(12) United States Patent
Aronovich (10) Patent No.: US 11,366,694 B1
(45) Date of Patent: Jun. 21, 2022

(54) ESTIMATING ATTRIBUTES OF RUNNING WORKLOADS ON PLATFORMS IN A SYSTEM OF MULTIPLE PLATFORMS AS A SERVICE

(71) Applicant: International Business Machines Corporation, Armonk, NY (US)

(72) Inventor: Lior Aronovich, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 17/113,100

(22) Filed: Dec. 6, 2020

(51) Int. Cl.
  *G06F 9/50* (2006.01)
  *G06F 9/48* (2006.01)

(52) U.S. Cl.
  CPC .......... G06F 9/5005 (2013.01); G06F 9/4856 (2013.01); *G06F 2209/503* (2013.01); *G06F 2209/506* (2013.01); *G06F 2209/5021* (2013.01)

(58) Field of Classification Search
  CPC ................. G06F 9/5005; G06F 9/4856; G06F 2209/5021; G06F 2209/503; G06F 2209/506
  See application file for complete search history.

(56) References Cited

U.S. PATENT DOCUMENTS

| | | | |
|---|---|---|---|
| 7,571,154 B2 | 8/2009 | Emeis | |
| 8,645,529 B2 | 2/2014 | Doddavula | |
| 8,868,749 B2 | 10/2014 | Bartfai-Walcott | |
| 8,924,539 B2 | 12/2014 | Ferris | |
| 8,978,035 B2 | 3/2015 | McGrath | |
| 9,128,760 B2 | 9/2015 | Karstens | |
| 9,195,509 B2 | 11/2015 | Bartfai-Walcott | |
| 9,262,231 B2 | 2/2016 | Breternitz | |
| 9,323,561 B2 | 4/2016 | Ayala | |
| 9,344,380 B2 | 5/2016 | Zhu | |
| 9,384,061 B1 | 7/2016 | Deivanayagam | |
| 9,537,973 B2 | 1/2017 | Batrouni | |

(Continued)

FOREIGN PATENT DOCUMENTS

| | | |
|---|---|---|
| CN | 105068863 A | 11/2015 |
| CN | 106055395 A | 10/2016 |

(Continued)

OTHER PUBLICATIONS

"Jelastic PaaS: Basics Reference & Terminology", Jelastic Dev Docs, Jelastic 2020, 10 pages, <https://docs.jelastic.com/paas-components-definition/>.

(Continued)

*Primary Examiner* — Sisley N Kim
(74) *Attorney, Agent, or Firm* — Edward Li (57) ABSTRACT

A computer-implemented method and a computer program product for estimating attributes of running workloads on platforms in a system of multiple platforms as a service. A computer receives definitions of respective workloads and respective platforms that are eligible to run a set of the respective workloads. The computer maps the respective workloads and the respective platforms to attributes of running the respective workloads on the respective platforms. The computer estimates the attributes and storing the attributes in a matrix. The computer updates the attribute in the matrix, in response to a triggering event for modifying the matrix.

20 Claims, 7 Drawing Sheets

(56) References Cited

U.S. PATENT DOCUMENTS

| | | | |
|---|---|---|---|
| 9,635,088 B2 | 4/2017 | Sharma | |
| 9,940,172 B2 | 4/2018 | Devarakonda | |
| 11,169,846 B2 | 11/2021 | Fatemi | |
| 2012/0173708 A1 | 7/2012 | Bartfai-Walcott | |
| 2015/0172205 A1 | 6/2015 | Anderson | |
| 2016/0043906 A1 | 2/2016 | Mithani | |
| 2018/0067655 A1 | 3/2018 | Greenfield | |
| 2018/0095778 A1 | 4/2018 | Aydelott | |
| 2019/0310893 A1 | 10/2019 | Aronovich | |
| 2019/0349428 A1 | 11/2019 | Kovacheva | |
| 2020/0127861 A1 | 4/2020 | Doshi | |
| 2020/0250009 A1 | 8/2020 | Jaeger | |
| 2020/0296155 A1* | 9/2020 | McGrath | G06F 9/5027 |
| 2020/0326983 A1 | 10/2020 | Chen | |
| 2021/0144517 A1* | 5/2021 | Guim Bernat | G06F 9/4881 |

FOREIGN PATENT DOCUMENTS

| | | | |
|---|---|---|---|
| CN | 111984269 A | | 11/2020 |
| EP | 2020/169182 | * | 8/2020 |
| KR | 20190131174 A | | 11/2019 |

OTHER PUBLICATIONS

Aronovich, Lior, "Optimizing Placements of Workloads on Multiple Platforms as a Service Based on Costs and Service Levels", U.S. Appl. No. 17/113,102, filed Dec. 6, 2020.

Aronovich, Lior, "Placements of Workloads on Multiple Platforms as a Service", U.S. Appl. No. 17/113,098, filed Dec. 6, 2020.

Benedict, Jon, "Choosing a Platform Based on Workload Characteristics", Red Hat Forum 2019, Oct. 19, 2019, 6 pages, <https://www.redhat.com/en/blog/choosing-platform-based-workload-characteristics>.

Li, et al., "Multi-resource workload mapping with minimum cost in cloud environment", Concurrency Computation Practice and Experience, vol. 31, Issue 15, Aug. 10, 2019, 15 pages, <https://doi.org/10.1002/cpe.5167>.

List of IBM Patents or Patent Applications Treated as Related. Filed Herewith. 2 pages.

Mell et al., "The NIST Definition of Cloud Computing", National Institute of Standards and Technology, Special Publication 800-145, Sep. 2011, 7 pages.

"Patent Cooperation Treaty PCT Notification of Transmittal of the International Search Report and the Written Opinion of the International Searching Authority, or the Declaration", Applicant's file reference IEE210866PCT, International application No. PCT/CN2021/126274, International filing date Oct. 26, 2021, dated Jan. 26, 2022, 10 pages.

"Patent Cooperation Treaty PCT Notification of Transmittal of the International Search Report and the Written Opinion of the International Searching Authority, or the Declaration", Applicant's file reference IEE21087IPCT, International application No. PCT/CN2021/126243, International filing date Oct. 26, 2021, dated Jan. 6, 2022, 9 pages.

Mishra et al., "Short Term Price Prediction for Preemptible VM Instances in Cloud Computing", 2019 5th International Conference for Convergence in Technology (I2CT), Pune, India. Mar. 29-31, 2019, 9 pages.

* cited by examiner

ESTIMATING ATTRIBUTES OF RUNNING WORKLOADS ON PLATFORMS IN A SYSTEM OF MULTIPLE PLATFORMS AS A SERVICE

BACKGROUND

The present invention relates generally to a platform-as-a-service (PaaS) model, and more particularly to estimating attributes of running workloads on platforms in a system of multiple platforms as a service.

In a platform-as-a-service (PaaS) model, workloads are placed to run on platforms rather than on virtual or physical machines. The platforms may include any combination of underlying resources, and this is usually not exposed to users of the platforms. The platforms typically expose an interface that enables to place, run, monitor, and control workloads on the platforms.

Some aspects are usually required to be handled in working with infrastructure-as-a-service (IaaS) platforms, such as selecting virtual machine (VM) types, creating and maintaining VM images, connecting or disconnecting VMs to or from clusters, returning VMs, waiting for VMs to provision, and tracking VMs, are eliminated in working with PaaS platforms. In PaaS, the two main concepts are workloads and platforms that run the workloads.

The PaaS platforms can be local and remote. Users create accounts on PaaS platforms, and workloads can then be uploaded and run on these PaaS platforms via the created accounts. The capability to run workloads on both local and remote platforms provides several benefits. Cost savings is one of the prominent benefits. Without spending money to build and maintain resources to accommodate spikes in resource usage that occur only occasionally, the hybrid cloud mechanism enables to offload workload from local platforms to remote platforms, and therefore the additional resources are payed only when it is needed, thereby reducing the total cost of ownership. Another benefit is the flexibility in using multiple cloud providers and platforms with different attributes, depending on considerations such as workload requirements and cost. Improved security is an additional benefit. Cloud providers can offer increased security, isolation, and communication over a private network, addressing security and compliance aspects. The hybrid cloud mechanism provides scalability by placing workloads dynamically on cloud platforms. In addition, by leveraging resources of cloud providers, the exposure to outages and downtime can be minimized.

SUMMARY

In one aspect, a computer-implemented method for estimating attributes of running workloads on platforms in a system of multiple platforms as a service is provided. The computer-implemented method includes receiving definitions of respective workloads and respective platforms that are eligible to run a set of the respective workloads. The computer-implemented method further includes mapping the respective workloads and the respective platforms to attributes of running the respective workloads on the respective platforms. The computer-implemented method further includes estimating the attributes and storing the attributes in a matrix. The computer-implemented method further includes updating the attribute in the matrix, in response to a triggering event for modifying the matrix.

In another aspect, a computer program product for estimating attributes of running workloads on platforms in a system of multiple platforms as a service is provided. The computer program product comprises a computer readable storage medium having program instructions embodied therewith, and the program instructions are executable by one or more processors. The program instructions are executable to: receive definitions of respective workloads and respective platforms that are eligible to run a set of the respective workloads; map the respective workloads and the respective platforms to attributes of running the respective workloads on the respective platforms; estimate the attributes and storing the attributes in a matrix; and update the attribute in the matrix, in response to a triggering event for modifying the matrix.

DETAILED DESCRIPTION

Following is a definition of the problem considered in this disclosure. A plurality of workloads are available for running or are already running. A plurality of platforms are available for running the plurality of workloads. Some of the plurality of platforms may be running workloads. Each workload may have a required time for completing its processing. Each workload may perform differently on each platform, in terms of its resource consumption and time to complete. Each platform incurs different sets of costs which may change over time. The costs per platform may vary depending on usage of specified resources, time intervals, and other aspects. Each platform may have different capacity limits. Some of the plurality of platforms may be local while some of the plurality of platforms may be remote. An objective is to find a mapping between the plurality of workloads and the plurality of platforms, and the mapping minimizes the workloads' time to complete and the total cost incurred by using the platforms.

Existing commercial systems for cloud bursting have several limitations. In a platform-as-a-service (PaaS) model, systems typically rely on system administrators to identify, via monitoring tools, situations of shortage of resources or excess of resources, to monitor and determine which applications should be moved, to monitor and regulate budget utilization, and to manage the provisioning and release of cloud resources. Platform-as-a-Service clouds are relatively new, and current PaaS cloud systems provide limited or no support for managing service levels and budget aspects.

To overcome the above limitations, embodiments of the present invention focus on the platform as a service cloud model. Embodiments of the present invention support any type of workloads and workload environments; there is no assumption made regarding a virtualized environment. Embodiments of the present invention consider in conjunction service level, budget, cost, resource, workload, and platform considerations. Embodiments of the present invention support a plurality of local and remote clouds with different attributes. Embodiments of the present invention optimize in an automated way, workload service levels, and cloud usage costs, subject to constrains regarding budgets, resources, and platforms. Embodiments of the present invention provide a scalable solution.

Figure 1:
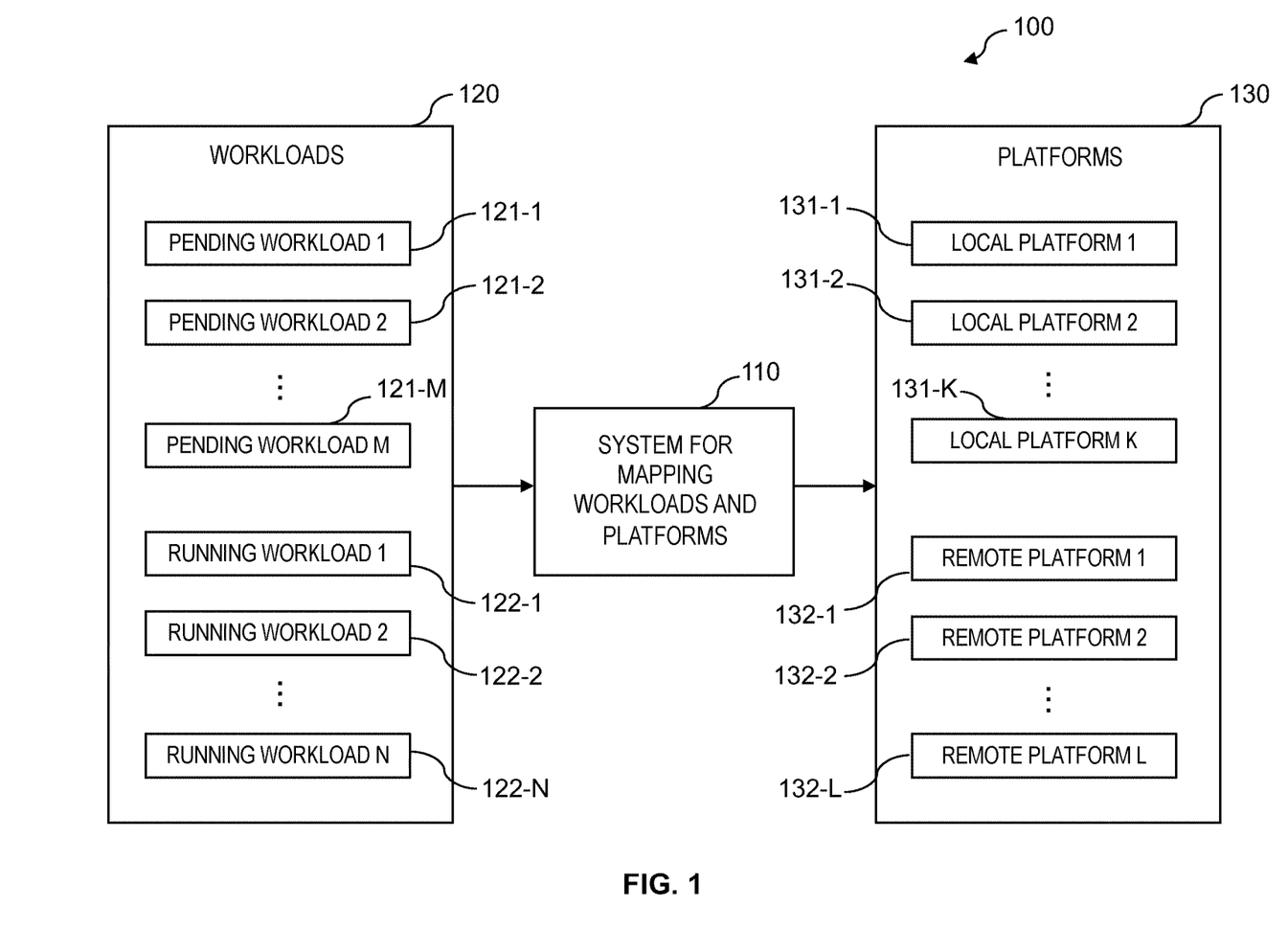
FIG. 1 illustrates a system of multiple platforms as a service, in accordance with one embodiment of the present invention.

FIG. 1 illustrates system 100 of multiple platforms as a service, in accordance with one embodiment of the present invention. System 100 of multiple platforms as a service comprises workloads 120, platforms 130, and system 110 for mapping workloads 120 and platforms 130. Workloads 120 includes M pending workloads (pending workload 1 121-1, pending workload 2 121-2, . . . , and pending workload M 121-M). The pending workloads are to be placed on the platforms. Workloads 120 further includes N running workloads (running workload 1 122-1, running workload 2 122-2, . . . , and running workload N 122-N). The running workloads are currently running on the platforms. Platforms 130 includes K local platforms (local platform 1 131-1, local platform 2 131-2, . . . , local platform K 131-K) and L remote platforms (remote platform 1 132-1, remote platform 2 132-2, . . . , remote platform L 131-L). Platforms 130 may be provided by one or more cloud providers.

Users request to run the pending workloads on the platforms; system 110 for mapping calculates optimal placements of the pending workloads on the platforms, and system 110 for mapping places the pending workloads on the platforms according to the optimal placements. Upon any change (e.g., adding any new workload to system 100 or any change in a requirement of a workload, detailed descriptions given in later paragraphs of this document), system 110 for mapping recalculates optimal placements of the running workloads on the platforms. According to the optimal placements of the running workloads, system 110 for mapping moves or migrates one or more of the running workloads form current platforms to calculated optimal platforms for the one or more of the running workloads, in response to that the current platforms are not the calculated optimal platforms.

System 110 for mapping may reside on a computing device or a server. The computing device or server is described in more detail in later paragraphs with reference to FIG. 4. System 110 for mapping between workloads 120 and platforms 130 is implemented in a cloud computing environment. Later paragraphs with reference to FIG. 5 and FIG. 6 describe in detail the cloud computing environment.

Mapping Workloads and Platforms to Running Attributes:

System 110 for mapping receives definitions of a plurality of workloads and a plurality of platforms that are eligible to run the plurality of the workloads. System 110 for mapping models attributes of running a specific workload on a specific platform, by using a mapping function that maps each pair of a workload and a platform to the attributes of running this workload on this platform, as follows:

$$[\text{Workload}(WK), \text{Platform}(PL)] \rightarrow [\text{Cost}, \text{Estimated Duration to Complete}(EDC), \text{Resource Requirements}(RR)]$$

where Cost is an estimated cost of running the specified workload on the specified platform; where Estimated Duration to Complete (EDC) is an estimated time duration to complete the specified workload running on the specified platform, measured from the time the workload starts to run on the platform, which does not include any waiting time of the workload before starting to run; and where "Resource Requirements (RR)" in the terms of the platform is estimated resource requirements of the specified workload running on the specified platform, in the terms of the main resource(s) charged by the specific platform. Each platform defines the resources based on which the usage charge is calculated. Cost and EDC are learned and estimated by system 110 for mapping. RR can be estimated by system 110 for mapping or provided by user inputs, depending on the interfaces provided by platforms.

Matrix WkPl Including Attributes of Running Workloads on Platforms:

Mapping of each pair of respective workloads and respective platforms to the attributes of running respective workloads on respective platforms can be stored in a matrix. For example, each workload is represented by a row in the matrix, and each platform is represented by a column in the matrix, and the attributes of running a specific workload on a specific platform are stored in a cell in the matrix. Let the matrix be denoted as WkPl. Table 1 illustrates an example of the WkPl matrix.

TABLE 1

Example of Matrix WkPl

|  | Platform 1 | Platform 2 | Platform 3 |
| --- | --- | --- | --- |
| Workload 1 | [$1.5, 1800 sec, (2 cores, 1 G memory)] | [$2, 1000 sec, (4 cores, 1 G memory)] | [$0.5, 3000 sec, (2 cores, 1 G memory)] |
| Workload 2 | — | — | — |
| Workload 3 | — | — | — |

The cell in the matrix WkPl stores attributes of running a specific workload $WK_i$ on a specific platform $PL_j$, and the cell is denoted as $WkPl[WK_i, PL_j]$. An attribute, from the attributes Cost, EDC, and RR, associated with running a specific workload $WK_{ti}$ on a specific platform $PL_j$ is denoted as Attribute $(WkPl [WK_i, PL_j])$; for example, Cost $(WkPl [WK_i, PL_j])$.

Update of Matrix WkPl:

System 110 for mapping updates the matrix WkPl upon any of the following triggering events.

(1) A new workload is added to system 100. In this case, a new row will be added to the matrix WkPl.

(2) One or more requirements of a workload are changed. In this case, cells of a row associated with this workload are changed.

(3) A workload has completed processing on a specific platform. In this case, actual running attributes of the workload on the platform may be updated in a cell associated with the workload and the platform. The actual running attributes of the workload on the platform are also added to an estimation mechanism for the Cost, EDC and RR metrics. Attributes of other workloads possibly running on the same platform may be also updated.

(4) Processing a workload on a platform is completed, and thus the workload is periodically or immediately removed from the matrix WkPl. In this case, a row associated with the workload to be removed will be removed from the matrix WkPl. If the removal is periodic, it will be applied according to a removal criteria, e.g., a criteria that is based on time attributes of the workload.

(5) A new platform is added. In this case, a new column is added to the matrix WkPl, with estimated values of the attributes for respective ones of the workloads.

(6) The cost charged by a platform is changed. In this case, information stored in a matrix column associated with the platform will be updated.

(7) Quantities and/or types of resources available by a platform are changed. In this case, information stored in a matrix column associated with the platform will be updated.

(8) A platform is removed. In this case, a column associated with the removed platform is removed.

To discover any of the above triggering events, system 110 for mapping, which maintains the matrix WkPl, periodically scans and monitors the workloads to determine current status of the workloads, and the system periodically scans and monitors the platforms to determine current status of the platforms.

System 110 for mapping starts to build the matrix WkPl with columns defining available platforms and without rows. As workloads are added, system 110 for mapping adds rows to the matrix; in cells of this row, system 110 for mapping adds estimated values of the attributes of the workloads on the available platforms.

Estimating Cost, EDC, and RR:

To estimate the Cost, EDC, and RR metrics for each pair of workloads and platforms, system 110 uses estimations based on previously recorded information, namely running attributes of other workloads of the same type running on a specific platform. If a workload for which the metrics are being estimated is currently running, it is also possible for system 110 to consider a current state in processing of the workload.

In estimating the Cost, EDC, and RR metrics, the following aspects are considered.

(1) Workload type. Each workload may be associated with a workload type. Each workload type groups workloads that have similarities in running characteristics and resources requirements. The association of a given workload to a type can be specified via user input that is provided to system 110 as part of the attributes of the given workload. The estimation mechanism of the Cost, EDC and RR metrics, used by system 110, is based on the availability of the type attribute for each of the workloads, to enable association of a given workload with previous workloads of a same type. Estimated metrics are calculated for each workload type. For each workload type, aggregated and/or detailed information of the metrics or the attributes of running the workloads on the platforms is determined and stored for the workload type, to facilitate estimations for workloads associated with the workload type. The actual running attributes of a complete workload are used to update the aggregated and/or detailed information stored for the workload type to which the complete workload is associated.

(2) Additivity of the metric values. The Cost, EDC and RR metrics collected should represent each workload independently and should be additive.

(3) PaaS cloud charging models. A PaaS cloud platform usually has one or more resources by which usage consumption and charges are calculated; for example, the amount of memory used or the number of workload processes used can be used to calculate usage consumption and charges. These resources are usually software defined (rather than hardware defined). Cost charges are usually proportional to the consumption of these resources, and are typically calculated relative to the consumption of these resources per time unit for a user. There may also be bounds on the maximal usage of these resources per user. A PaaS cloud platform may offer several service types, for which usage costs may be calculated separately or combined, depending on how cost charges are calculated. The service types may also be associated with maximal usage bounds on resources per user.

(4) Calculation of resource consumption and cost for a running or complete workload. If a platform reports information of the resource consumption and cost for running a specific workload, then the information of the reported resource consumption and cost can be used by system 110 to update the resource requirement and cost information for the workload type corresponding to the workload (or to update the aggregated and/or detailed information stored for the workload type). If a platform reports cost information based on resource usage per time unit for a user or the resource consumption and costs are not reported per workload, then the resource consumption and cost for running a specific workload can be calculated by several ways: ① One way is to collect information of the resource consumption and cost reported by the platform while running the workload on its own for the specific user on the specific platform. ② Another way is to extract a resource consumption proportion for running the specific workload relative to the other workloads, by using for example operating system monitoring information, and then applying this proportion to calculate the resource consumption and cost of the specific workload out of the resource consumption and cost reported by the platform for the plurality of workloads running by the user. ③ A further way to obtain the resource requirement and cost per workload is by receiving this information via user input or using a user input if automatic estimation is not possible. Then, the information of the reported resource consumption and cost obtained by the above-mentioned ways is used to update the aggregated and/or detailed information stored for the workload type.

(5) Workload migration cost. This cost can be added for workloads that are running; it is as an additional component to the estimation of the cost, estimated duration to complete, and estimated resource requirements, and it is on top of the estimations that do not take into account migration. The added component of the cost can be either positive or negative, depending on the current status of the workload in its run and the costs of migrating the workloads environment. If the migration cost is added, then the estimations per platform can be different relative to the estimation without migration for each workload. The migration cost is a cost of migrating one running workload from its current platform to its optimal platform that is determined by system 110 for mapping.

Overall Attributes:

The overall attributes include OverallBudget. OverallBudget is a monetary overall budget assigned per user/organizational unit, and it is used for the workloads run by the user/organizational unit.

Workload Attributes:

A workload ($WK_i$) has the following attributes. (1) OriginalBudget($WK_i$): It is a monetary budget assigned to workload $WK_i$. (2) RemainingBudget($WK_i$): It is a monetary current remaining budget (after expenditures) assigned to workload $WK_i$. (3) RDC($WK_i$): It is a requested time duration to complete workload $WK_i$ on a platform, specified from the submission time of the workload. RDC($WK_i$) is considered a best effort (soft) constraint. (4) SubmissionTime($WK_i$): It is the submission time of workload $WK_i$. (5)

Priority(WK$_i$): It is a priority assigned to workload WK$_i$. The priority is relative to the priorities of other workloads.

(6) EligiblePlatforms(WK$_i$): It is a list of platforms, specified in terms of the platform indexes in matrix WkPl, where the platforms in the list are eligible to run workload WK$_i$. For a specific workload, the eligible platforms list can be a subset of the platforms, which is selected, for example, based on the type of the platforms and user access to the platforms.

Platform Attributes:

Platform attributes of a platform (PL$_j$) include MaxResource(PL$_j$). The attribute of MaxResource(PL$_j$) is a maximal bound for a user on the consumption of the main resource charged by platform PL$_j$. A main resource can be, for example, memory size or number of workload processes.

Figure 2:
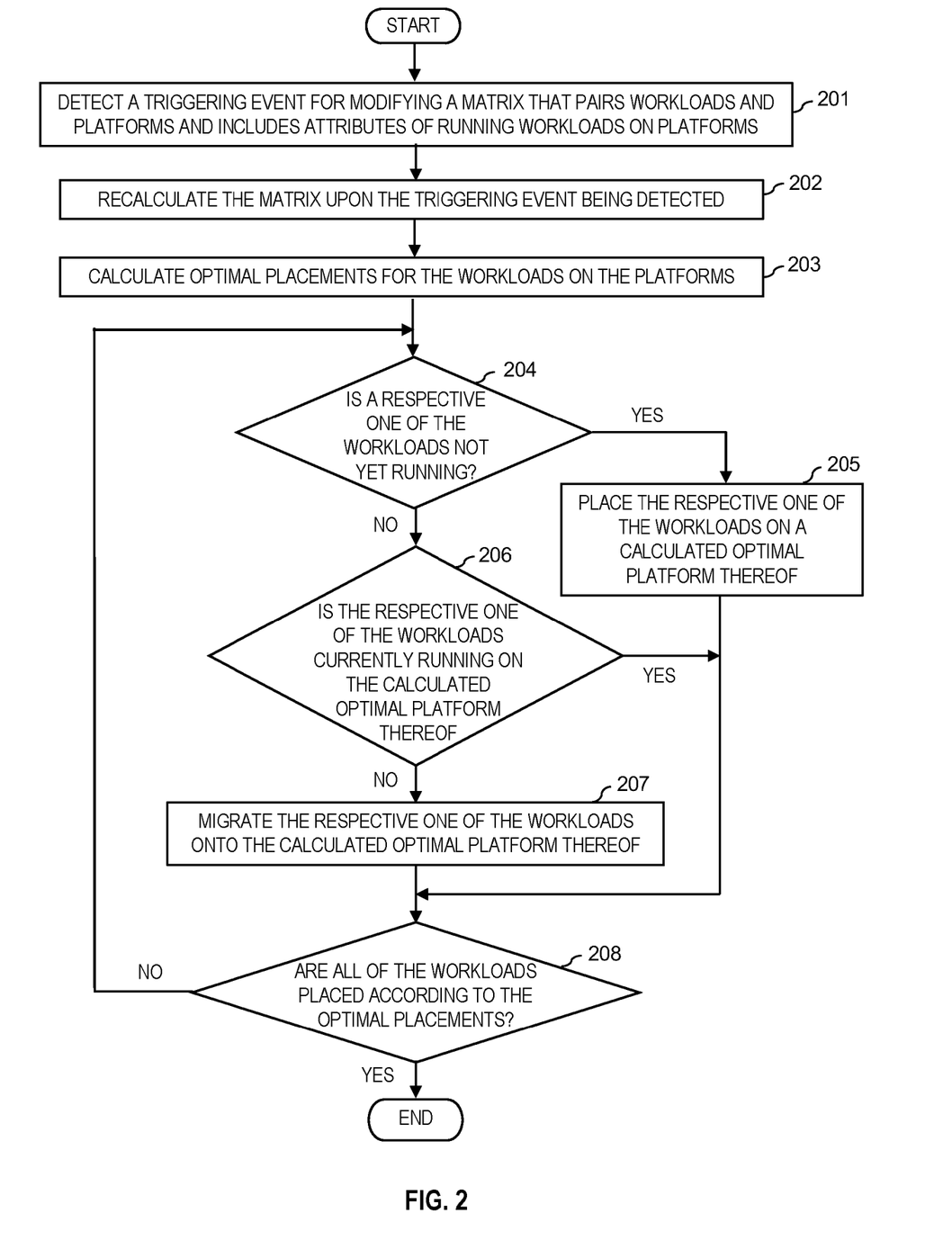
FIG. 2 presents a flowchart showing operational steps of placing workloads on multiple platforms, in accordance with one embodiment of the present invention.

Placements of Workloads Based on Cost and Service Level Considerations on Multiple Platforms as a Service:

FIG. 2 presents a flowchart showing operational steps for placements of workloads on multiple platforms, in accordance with one embodiment of the present invention. At step 201, a system for mapping the workloads and the platforms (e.g., system 110 shown in FIG. 1) detects a triggering event for modifying a matrix that pairs workloads and platforms and includes attributes of running workloads on platforms. For example, the matrix is matrix WkPl described in previous paragraphs. To detect the triggering event for modifying the matrix, the system for mapping periodically scans and monitors the workloads and the platforms to determine current status of the workloads and the platforms. The triggering event is at least one of the following events: a new workload is added to a system of multiple platforms as a service; one or more of requirements (budget, requested duration to complete, priority, eligible platforms) of a respective one of the workloads are changed; a workload has completed processing on a respective one of the multiple platforms; a new platform is added to the system of multiple platforms as a service; a cost of a respective one of the multiple platforms is changed; availability, quantities or types of resources available by a respective one of the multiple platforms are changed; maximal resource utilization per user for a respective one of the multiple platforms is changed; a respective one of the multiple platforms is removed from a system of multiple platforms as a service; and an overall budget is changed.

At step 202, the system for mapping recalculates the matrix upon the triggering event being detected. For example, matrix WkPl is recalculated; in the matrix, the attributes of running the workloads on platforms are updated.

At step 203, the system for mapping calculates optimal placements for the workloads on the platforms. The system for mapping uses an algorithm solving an optimization problem. The optimization problem and the algorithm solving thereof will be discussed in detail in later paragraphs in conjunction with FIG. 3.

At step 204, the system for mapping determines whether a respective one of the workloads is not yet running on a respective one of the platforms. For example, if the respective one of the workloads is not yet running, the respective one of the workloads is a pending workload (for example, as shown in FIG. 1, it is pending workload 1 121-1, pending workload 2 121-2, . . . , or pending workload M 121-M) and it is waiting for being mapped (by the system for mapping) to one platform; if the respective one of the workloads is running, the respective one of the workloads is a running workload (for example, as shown in FIG. 1, it is running workload 1 122-1, running workload 2 122-2, . . . , or running workload N 122-N).

In response to determining that the respective one of the workloads is not yet running (YES branch of decision block 204), at step 205, the system for mapping places the respective one of the workloads on a calculated optimal platform for the respective one of the workloads. The optimal platform is calculated at step 203.

In response to determining that the respective one of the workloads is running (NO branch of decision block 204), at step 206, the system for mapping determines whether the respective one of the workloads is currently running on the calculated optimal platform (which is calculated at step 203). In other words, the system for mapping determines whether a current platform on which the respective one of the workloads is running is the calculated optimal platform for the respective one of the workloads.

In response to determining that the respective one of the workloads is not currently running on the calculated optimal platform (NO branch of decision block 206) or the current platform is not the calculated optimal platform for the respective one of the workloads, at step 207, the system for mapping moves or migrates the respective one of the workloads from the current platform to the calculated optimal platform.

In response to determining that the respective one of the workloads is currently running on the calculated optimal platform (YES branch of decision block 206) or the current platform is the calculated optimal platform for the respective one of the workloads, the system for mapping will not move or migrate the respective one of the workloads from the current platform to another platform, and keeps the respective one of the workloads on the current platform (which is the optimal platform for the respective one of the workloads).

In response to determining that the respective one of the workloads is currently running on the calculated optimal platform (YES branch of decision block 206), after step 205, or after step 207, the system for mapping will execute step 208. At step 208, the system for mapping determines whether all of the workloads are placed according to the optimal placements (which is calculated at step 203).

In response to determining that all of the workloads are placed according to the optimal placements (YES branch of decision block 208), the system for mapping completes placements of workloads, based on cost and service level considerations on multiple platforms as a service or according to the optimal placements. In response to determining that not all of the workloads are placed according to the optimal placements (NO branch of decision block 208), the system for mapping iterates steps 204-208, until all of the workloads are placed according to the optimal placements.

Optimization Problem Formulation:

An objective of the optimization problem is to find platform indexes ($\{P_i\}_{i=1}^{WKN}$; $\forall 1 \leq P_i \leq PLN$) to minimize a total cost for all the workloads. The objective function is as follows:

$$\min\left\{\sum_{i=1}^{WKN} \text{Cost}(WkPl[i, P_i])\right\}.$$

The platform index $P_i$ identifies optimal platform for workload WK$_i$, and the platform indexes $\{P_i\}$ identify optimal platforms for respective ones of the workloads. WKN is the number of the workloads, and PLN is the number of the platforms. The objective function is subject to the following constraints.

The first constraint is

∀i EDC (WkPl[i, $P_i$])≤RDC ($WK_i$), which is a best effort (or soft) constraint. This constraint requires that, for each workload, its estimated duration to complete (EDC) on a selected platform does not exceed its required duration to complete (RDC).

The second constraint is

∀i Cost (WkPl[i, $P_i$])≤RemainingBudget ($WK_1$), which is a mandatory (or hard) constraint. The second constraint requires that, for each workload, its cost (Cost) of running on a selected platform does not exceed its remaining budget (RemainingBudget).

The third constraint is $$\sum_{i=1}^{WKN} Cost(WkPl[i, P_i]) \leq OverallBudget,$$

which is a mandatory (or hard) constraint. The third constraint requires that the total cost for running all the workloads on their selected platforms does not exceed the overall budget (OverallBudget).

The fourth constraint is

∀i $P_1$∈EligiblePlatforms ($WK_i$), which is a mandatory (or hard) constraint. The fourth constraint requires that a selected platform for a workload be one of the platforms eligible to run the workload.

The fifth constraint is $$\forall j \sum_{i=1}^{WKN} \left\{ \begin{array}{l} RR(WkPl[i, P_i] \text{ if } P_i = j \\ 0 \text{ if } P_i \neq j \end{array} \right\} \leq MaxResource(PL_j),$$

which is a mandatory (or hard) constraint. The fifth constraint requires that resources consumed from a platform by the workloads running on the platform do not exceed the platform's resource consumption maximal bound for the user or the resource capacity or the resource consumption maximal bound of any platform cannot be exceeded.

Algorithm for the Optimization Problem:

The optimization problem includes an objective cost function and constraint functions, with variables $P_1$, $P_2$, . . . , $P_{WKN}$ (platform indexes). Since the mathematical way, by which each of the objective and constraint functions depend on variables $P_1$, $P_2$, . . . , $P_{WKN}$, cannot be defined in the formulation (however, this depends on the values stored in matrix WkPl based on estimation methods previously discussed), mathematical programming solvers cannot be applied to this optimization problem. A greedy algorithm paradigm, which uses locally optimal choices step-by-step progressing towards a global optimum, is applicable to the optimization problem defined here.

A system for mapping the workloads and the platforms (e.g., system 110 shown in FIG. 1) starts by placing each workload on the platform that yields the lowest cost for the workload. Then, for the workloads whose estimated duration to complete (EDC) exceeds their required duration to complete (RDC), the system increments the cost step by step. In each step, the system for mapping selects a workload with a lowest upgrade cost, where an upgrade of a workload must enable the workload's estimated duration to complete (EDC) to be at or below its required duration to complete (RDC). The system for mapping then upgrades the selected workload. In each step, the mandatory constraints and the best effort constrain are checked.

In solving the optimization problem, the input is a latest matrix WkPl, and the result of solving the optimization problem is the following: for each workload $WK_i$, an associated platform index $P_i$ in matrix WkPl is calculated, where associated platform index $P_i$ identifies an optimal platform for running workload $WK_i$.

Figure 3A:
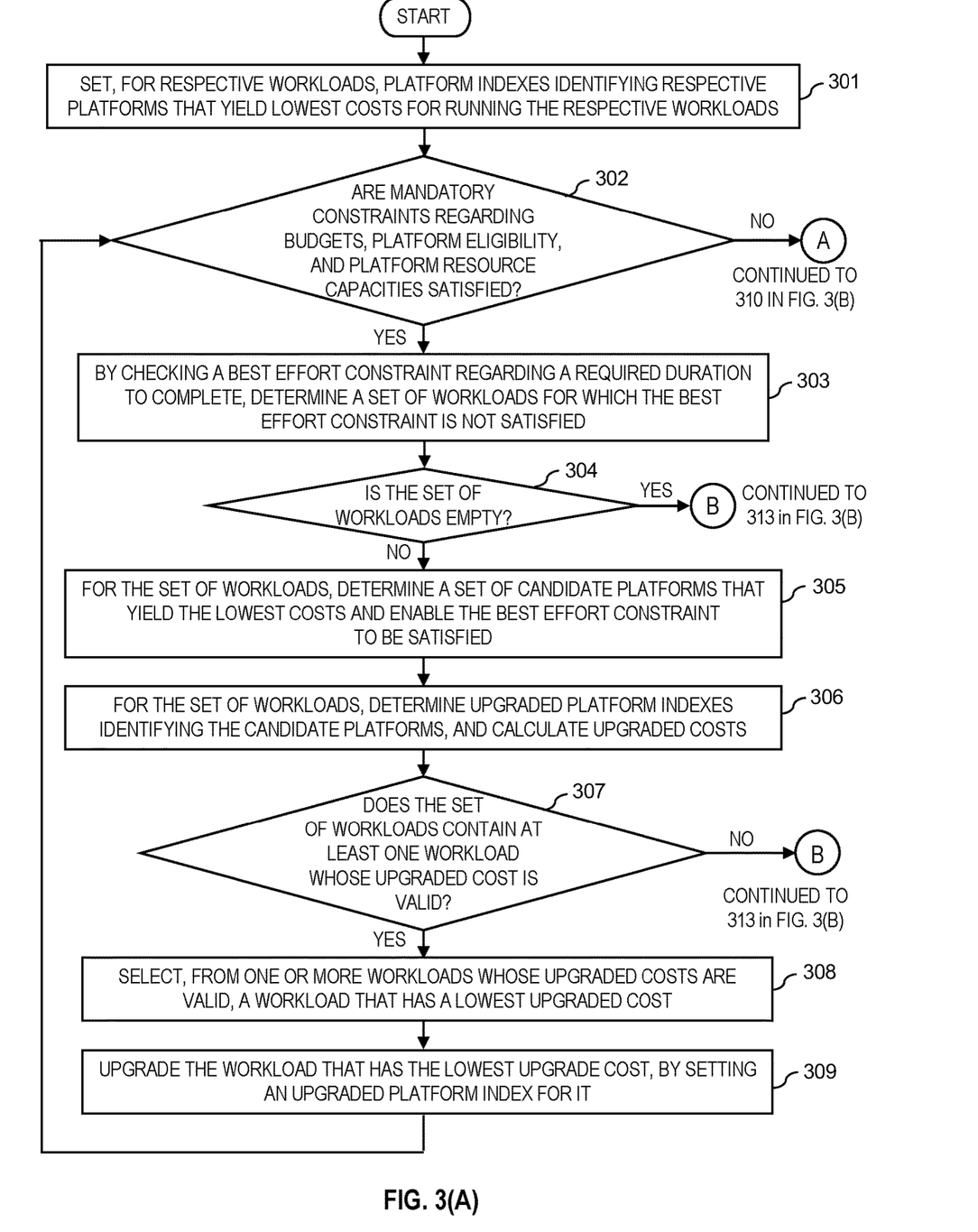
FIG. 3(A) and FIG. 3(B) present a flowchart showing operational steps of optimizing placements of workloads on multiple platforms, in accordance with one embodiment of the present invention.
Figure 3B:
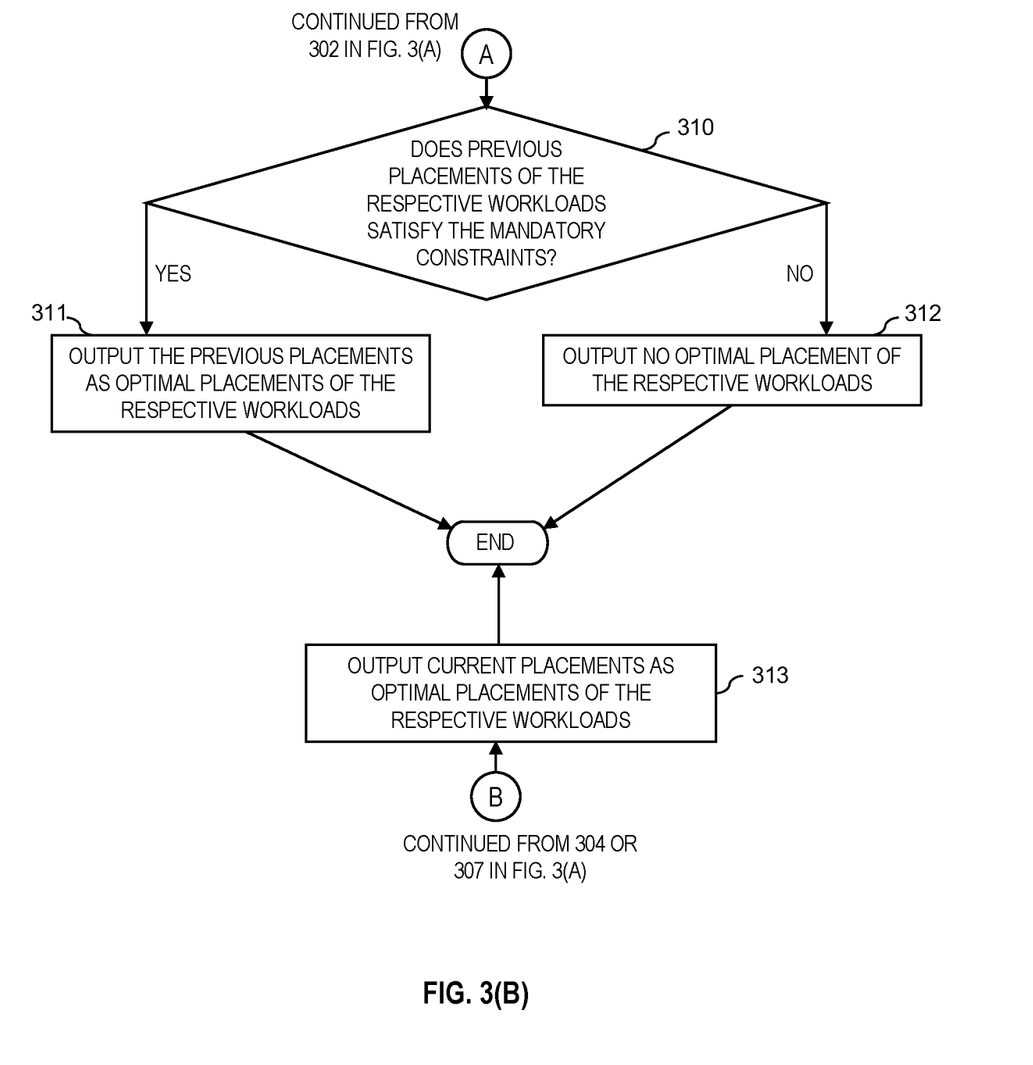

FIG. 3(A) and FIG. 3(B) present a flowchart showing operational steps of optimizing placements of workloads on multiple platforms, in accordance with one embodiment of the present invention.

Referring to FIG. 3(A), at step 301, a system for mapping the workloads and the platforms (e.g., system 110 shown in FIG. 1) sets, for respective workloads, platform indexes identifying respective platforms that yield lowest costs for running the respective workloads. For each workload $WK_i$, the system for mapping sets an associated platform index $P_i$ value in matrix WkPl, and the platform that is identified by such a platform index $P_i$ value yields a lowest cost for running workload $WK_i$. Platform index $P_i$ satisfies:

$P_i$={j|1≤j≤PLN∧∀k1≤k≤PLN:Cost(WkPl[i,k]≥Cost (WkPl[i,j])}

Referring to FIG. 3(A), at step 302, the system for mapping determines whether mandatory constraints regarding budgets, platform eligibility, and platform resource capacities are satisfied. The system for mapping checks whether the mandatory (or hard) constraints are satisfied; the mandatory (or hard) constraints are the second, third, fourth, and fifth constraints which are discussed in previous paragraphs of this document.

In response to determining that the mandatory constraints are not satisfied (NO branch of decision block 302), the system for mapping executes step 310 shown in FIG. 3(B). Referring to FIG. 3(B), at step 310, the system for mapping determines whether previous placements of the respective workloads satisfy the mandatory constraints. The previous placements are a solution of the optimization problem in a previous iteration.

Continuously referring to FIG. 3(B), in response to determining that the previous placements of the respective workloads satisfy the mandatory constraints (YES branch of decision block 310), at step 311, the system for mapping outputs the previous placements as optimal placements of the respective workloads. The system for mapping uses the previous solution as a result of the algorithm. Then, the system completes the steps of the algorithm.

Continuously referring to FIG. 3(B), in response to determining that the previous placements of the respective workloads do not satisfy the mandatory constraints (NO branch of decision block 310), at step 312, the system for mapping outputs no optimal placement of the respective workloads. There is no feasible solution for the optimization problem; the reason is as follows. The algorithm starts from the lowest cost mapping; if the budget constraints are violated for this mapping, then there is no feasible solution under the given constraints. Such a scenario can be classified as invalid user input to the algorithm. Thus, the system completes the steps of the algorithm.

Now referring back to FIG. 3(A), in response to determining that the mandatory constraints are satisfied (YES branch of decision block 302), at step 303, the system for mapping checks a best effort constraint regarding required durations to complete the respective workloads and determines a set of workloads for which the best effort constraint is not satisfied. The best effort constraint is the first constraint which is discussed in previous paragraphs of this document. Each workload in the set of workloads is identified by using its index in matrix WkPl. The set of workloads is denoted as WKS.

Referring to FIG. 3(A), the system for mapping determines whether the set of workloads (WKS) is empty. The set of workloads (WKS) being empty indicates that the best effort constraint regarding the required durations to complete (RDC) is satisfied. In response to determining that the set of workloads (WKS) is empty (YES branch of decision block 304), the system for mapping executes step 313 shown in FIG. 3(B). Referring to FIG. 3(B), at step 313, the system for mapping outputs current placements as optimal placements of the respective workloads. The current placements are a solution of the optimization problem in a current iteration. The system uses the current solution as a result of the algorithm. Then, the system completes the steps of the algorithm.

Now referring back to FIG. 3(A), in response to determining that the set of workloads (WKS) is not empty (NO branch of decision block 304), at step 305, the system for mapping determines, for the set of workloads (WKS), a set of candidate platforms that yield the lowest costs and enable the best effort constraint to be satisfied. For each of the workloads in the set (WK$_i$ in WKS), the system for mapping determines a platform with a lowest cost; with this platform, the best effort constraint is satisfied. The set of candidate platforms, $\{PC_i\}$, is as follows:

$$PC_i = \{j | 1 \leq j \leq PLN \land EDC(WkPl[i,j]) \leq RDC(WK_i)\}.$$

Referring to 3(A), at step 306, the system for mapping determines, for the set of workloads (WKS), upgraded platform indexes that identify the candidate platforms, and calculates upgraded costs. For each of the workloads in the set, $WK_i$, an upgraded platform index, $PU_i$, is calculated as follows:

$$PU_i = \{j | j \in PC_i \land \forall k\ k \in PC_i : Cost(WkPl[i,k]) \geq Cost(WkPl[i,j])\}.$$

The upgraded cost for $WK_i$ in set WKS can be denoted as:

$$UpgradeCost(WK_i) = Cost(WkPl[i, PU_i])$$

For a workload in set WKS, if no platform in the set of the candidate platforms is available because no platform enables the best effort constraint to be satisfied, then the system marks this workload as not feasible for upgrading and sets the upgraded cost of this workload as invalid or infinite for example (UpgradeCost ($WK_i$)=∞). Thus, the system avoids this workload to be added to set WKS in a next iteration of the algorithm; upgrading the workload will not be considered in the next iteration of solving the optimization problem.

Referring to FIG. 3(A), at step 307, the system for mapping determines whether the set of workloads (set WKS) contains at least one workload whose upgraded cost is valid. In response to determining that the set of workloads contains no workload whose upgraded cost is valid (NO branch of decision block 307), the system executes step 313 shown in FIG. 3(B). Referring to FIG. 3(B), at step 313, the system sets current placements as optimal placements of the respective workloads. The current placements are a solution of the optimization problem in a current iteration. The system uses the current solution as a result of the algorithm.

In this case, there is no further way to upgrade the solution of the optimization problem. Then, the system completes steps of the algorithm.

Now referring back to FIG. 3(A), in response to determining that the set of workloads contains at least one workload whose upgraded cost is valid (YES branch of decision block 307), at step 308, the system for mapping selects, from one or more workloads whose upgraded costs are valid, a workload that has a lowest upgraded cost. From the set of workloads (set WKS), the workload having the lowest upgraded cost is selected. The workload having the lowest upgraded cost is denoted as $WK_t$. $WK_t$ satisfies the following expression:

$$WK_t = \{j | j \in WKS \land \forall k\ k \in WKS : UpgradeCost(k) \geq UpgradeCost(j)\}.$$

$WK_t$ is a workload that provides the most cost-effective benefit found in this iteration of solving the optimization problem.

Referring to FIG. 3(A), at step 309, the system for mapping upgrades the workload that has the lowest upgrade cost, by setting an upgraded platform index for the workload that has the lowest upgrade cost. The system upgrades $WK_t$ by setting $P_t = PU_t$, where $PU_t$ is the upgraded platform index and $P_t$ is the latest selected platform index for $WK_t$.

After step 309, the system for mapping iterates step 302 for a next iteration of the algorithm, to find another most cost-effective benefit workload. The system for mapping executes a next iteration of solving the optimization problem, until the optimal placements of the respective workloads on the respective platforms are found.

Because an upgrade of a workload can be done only once in the algorithm for the optimization problem and an upgraded workload is not reconsidered by the algorithm in a next iteration, the number of iterations of the algorithms is bounded by the number of workloads. Within each iteration, a linear scan of the workloads can be done. Then, the algorithm for the optimization problem selects a workload for upgrade and proceeds to the next iteration. All the calculations specific per workload can be done once; only the constraints that consider all the workloads should be recalculated per iteration.

The algorithm for the optimization problem can be paralleled by performing all the independent calculations per workload, concurrently for all the relevant workloads. A further optimization to the algorithm can be maintaining all the basic data and counters of the various constraints for both workloads and platforms, and then update this data and counters incrementally when changes are made. This will enable faster calculation of the constraints.

Figure 4:
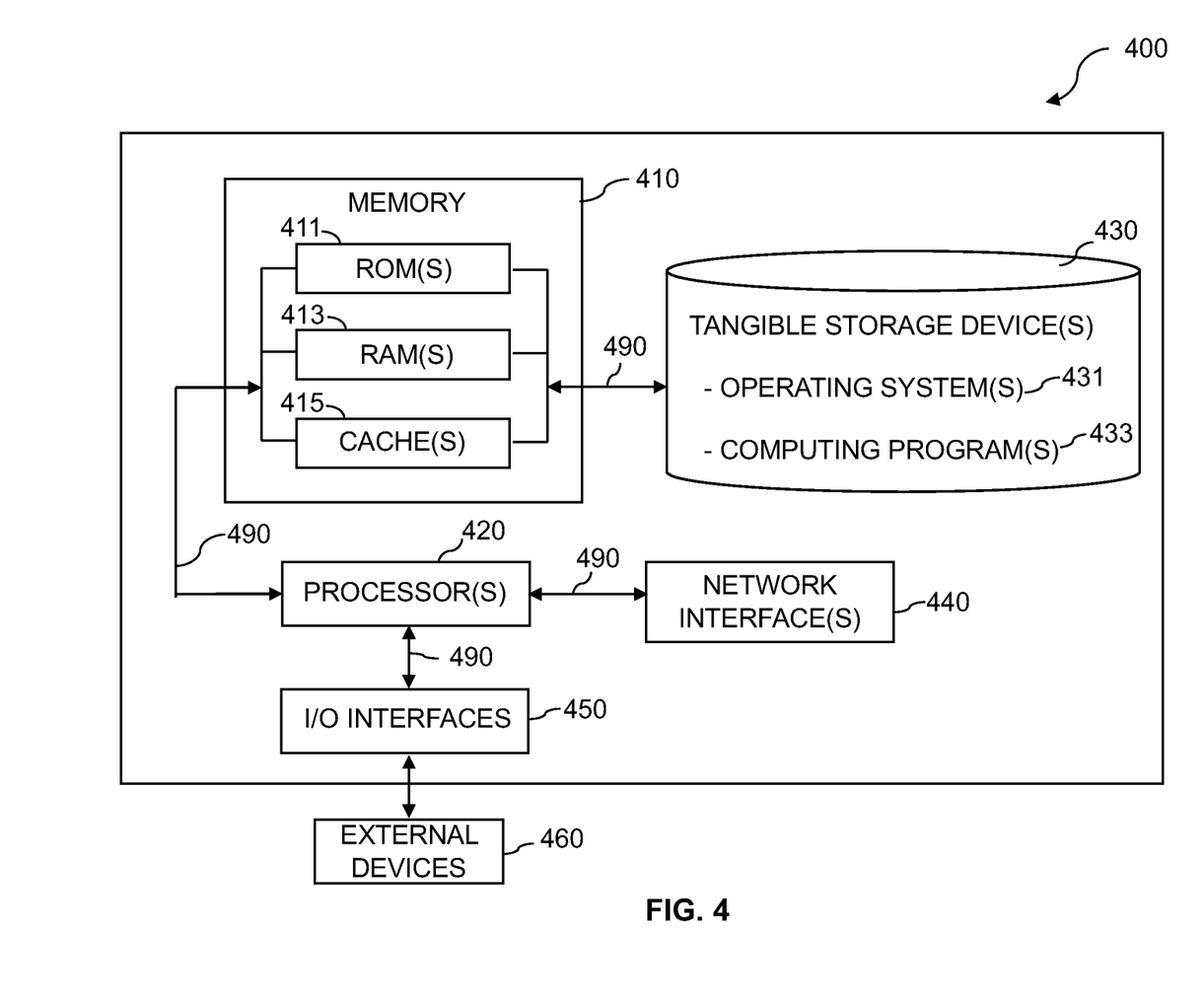
FIG. 4 is a diagram illustrating components of a computing device, in accordance with one embodiment of the present invention.

FIG. 4 is a diagram illustrating components of computing device or server 400, in accordance with one embodiment of the present invention. It should be appreciated that FIG. 4 provides only an illustration of one implementation and does not imply any limitations with regard to the environment in which different embodiments may be implemented.

Referring to FIG. 4, computing device or server 400 includes processor(s) 420, memory 410, and tangible storage device(s) 430. In FIG. 4, communications among the above-mentioned components of computing device or server 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer readable tangible storage device(s) 430.

Computing device or server 400 further includes I/O interface(s) 450. I/O interface(s) 450 allows for input and output of data with external device(s) 460 that may be connected to computing device or server 400. Computing device or server 400 further includes network interface(s) 440 for communications between computing device or server 400 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
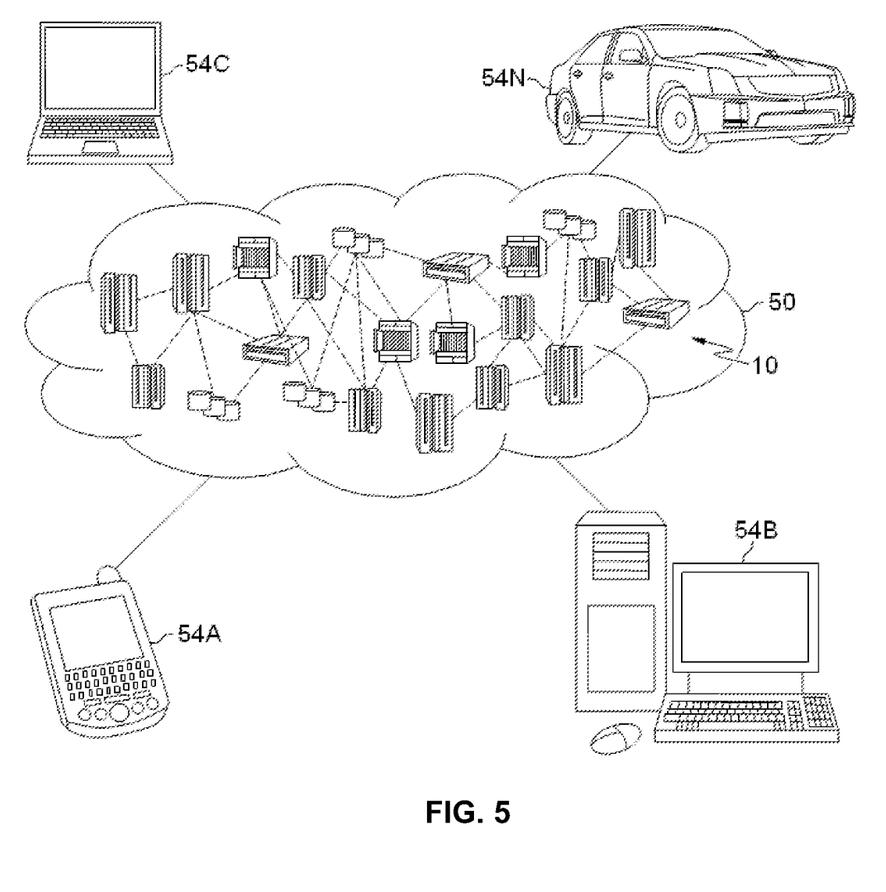
FIG. 5 depicts a cloud computing environment, in accordance with one embodiment of the present invention.

Referring now to FIG. 5, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 6:
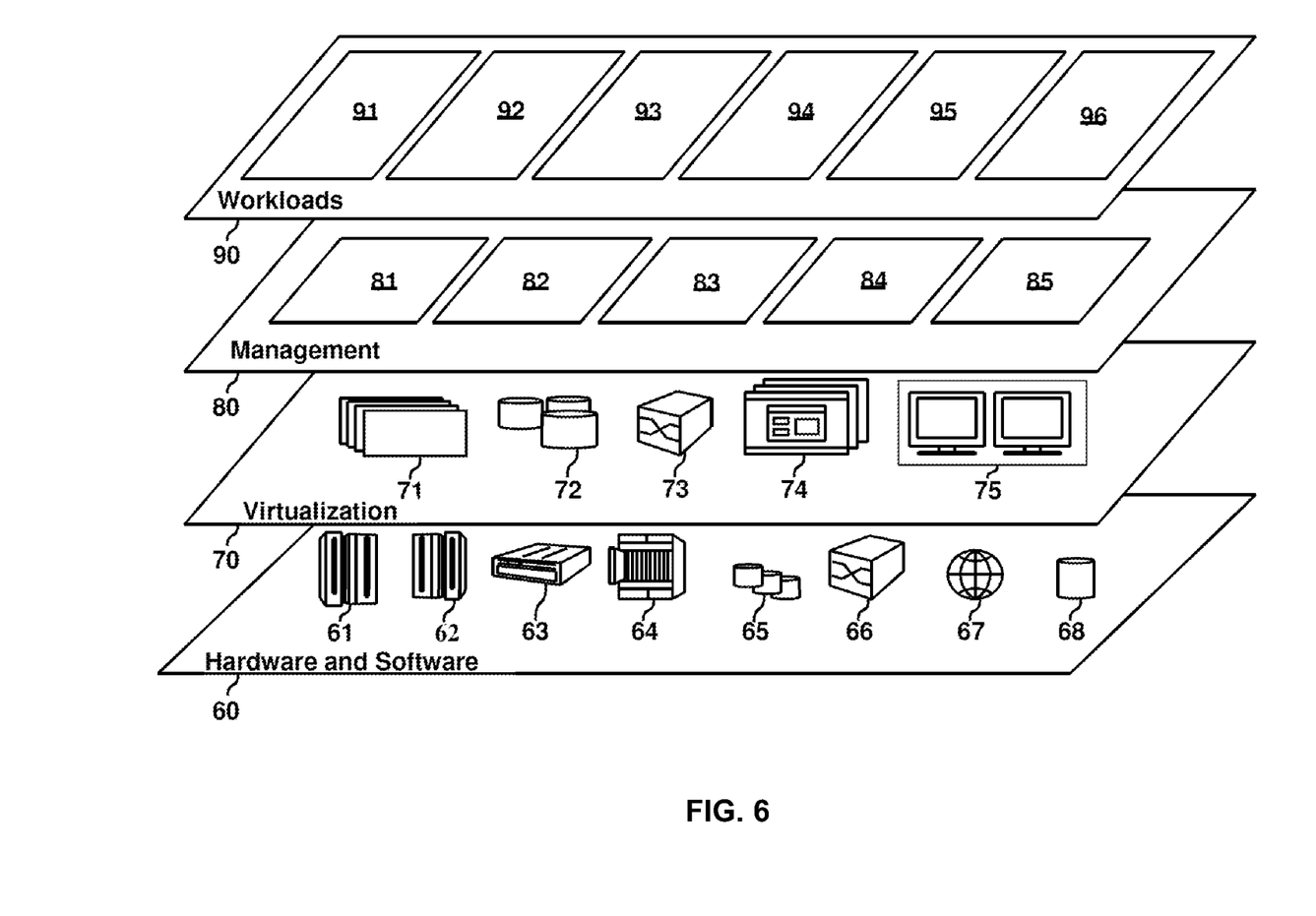
FIG. 6 depicts abstraction model layers in a cloud computing environment, in accordance with one embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 is the functionality for placements of workloads on multiple platforms as a service.

What is claimed is:

1. A computer-implemented method for estimating attributes of running workloads on platforms in a system of multiple platforms as a service, the method comprising:
   receiving definitions of respective workloads and respective platforms that are eligible to run a set of the respective workloads;
   mapping the respective workloads and the respective platforms to attributes of running the respective workloads on the respective platforms;
   estimating the attributes and storing the attributes in a matrix; and
   updating the attribute in the matrix, in response to a triggering event for modifying the matrix.

2. The computer-implemented method of claim 1, further comprising:
   estimating costs of running the respective workloads on the respective platforms, as one of the attributes.

3. The computer-implemented method of claim 1, further comprising:
   determining estimated durations to complete the respective workloads on the respective platforms, as one of the attributes.

4. The computer-implemented method of claim 1, further comprising:
   determining resource requirements by the respective workloads running on the respective platforms, as one of the attributes.

5. The computer-implemented method of claim 1, further comprising:
   for a currently running workload, adding a migration cost in the attributes; and
   wherein the migration cost is a cost for migrating the currently running workload form a current platform to an optimal platform for the currently running workload.

6. The computer-implemented method of claim 1, further comprising:
   grouping the respective workloads into one or more workload types, based on similarities in running characteristics and resource requirements;
   for each of the one or more workload types, determining and storing aggregated information of the attributes for the one or more workload types;
   using the aggregated information to estimate the attributes of running a new workload that is associated with one of the one or more workload types.

7. The computer-implemented method of claim 6, further comprising:
   in response to receiving from a platform resource consumption and cost information for running a workload, using the resource consumption and cost information to update the aggregated information for a workload type with which the workload is associated.

8. The computer-implemented method of claim 6, further comprising:
   in response to not receiving from a platform resource consumption and cost information for running a workload, determining the resource consumption and cost information by one of ways:
      collecting the resource consumption and cost information for running the workload while running the workload on the platform;
      extracting a resource consumption proportion of the workload which is relative to other ones of the respective platforms, and, based on consumption and cost information of the other ones of the respective platform, determining consumption and cost information of the workload;
      receiving user inputs;
   using the resource consumption and cost information to update the aggregated information for a workload type with which the workload is associated.

9. The computer-implemented method of claim 1, further comprising:
   scanning the respective workloads;
   detecting whether a new workload is added;
   detecting one or more requirements of a currently running workload are changed;
   detecting one of the respective workloads has completed processing;
   scanning the respective platforms;
   detecting whether a new platform is added;
   detecting whether a cost charged by one of the respective platforms is changed;
   detecting whether one or more resources of the one of the respective platform are changed;
   detecting whether the one of the respective platform is removed; and
   determining that the triggering event for modifying the matrix has been detected, in response to at least one of: the new workload being added, the one or more requirements of the currently running workload being changed, the one of the respective workloads having completed, the new platform being added, the cost charged by the one of the respective platforms being changed, the one or more resources being changed, and the one of the respective platform being removed.

10. The computer-implemented method of claim 1, wherein, based on information in the matrix, optimal placements of the respective workloads on the respective platforms are determined, wherein the respective workloads are placed on the respective platforms, based on the optimal placements.

11. A computer program product for estimating attributes of running workloads on platforms in a system of multiple platforms as a service, the computer program product comprising a computer readable storage medium having program instructions embodied therewith, the program instructions executable by one or more processors, the program instructions executable to:
receive definitions of respective workloads and respective platforms that are eligible to run a set of the respective workloads;
map the respective workloads and the respective platforms to attributes of running the respective workloads on the respective platforms;
estimate the attributes and storing the attributes in a matrix; and
update the attribute in the matrix, in response to a triggering event for modifying the matrix.

12. The computer program product of claim 11, further comprising the program instructions executable to:
estimate costs of running the respective workloads on the respective platforms, as one of the attributes.

13. The computer program product of claim 11, further comprising the program instructions executable to:
determine estimated durations to complete the respective workloads on the respective platforms, as one of the attributes.

14. The computer program product of claim 11, further comprising the program instructions executable to:
determine resource requirements by the respective workloads running on the respective platforms, as one of the attributes.

15. The computer program product of claim 11, further comprising the program instructions executable to:
for a currently running workload, add a migration cost in the attributes; and
wherein the migration cost is a cost for migrating the currently running workload form a current platform to an optimal platform for the currently running workload.

16. The computer program product of claim 11, further comprising the program instructions executable to:
group the respective workloads into one or more workload types, based on similarities in running characteristics and resource requirements;
for each of the one or more workload types, determine and store aggregated information of the attributes for the one or more workload types;
use the aggregated information to estimate the attributes of running a new workload that is associated with one of the one or more workload types.

17. The computer program product of claim 16, further comprising the program instructions executable to:
in response to receiving from a platform resource consumption and cost information for running a workload, use the resource consumption and cost information to update the aggregated information for a workload type with which the workload is associated.

18. The computer program product of claim 16, further comprising:
in response to not receiving from a platform resource consumption and cost information for running a workload, determining the resource consumption and cost information by one of ways:
collect the resource consumption and cost information for running the workload while running the workload on the platform;
extract a resource consumption proportion of the workload which is relative to other ones of the respective platforms, and, based on consumption and cost information of the other ones of the respective platform, determining consumption and cost information of the workload;
receive user inputs; and
use the resource consumption and cost information to update the aggregated information for a workload type with which the workload is associated.

19. The computer program product of claim 11, further comprising:
scan the respective workloads;
detect whether a new workload is added;
detect one or more requirements of a currently running workload are changed;
detect one of the respective workloads has completed processing;
scan the respective platforms;
detect whether a new platform is added;
detect whether a cost charged by one of the respective platforms is changed;
detect whether one or more resources of the one of the respective platform are changed;
detect whether the one of the respective platform is removed; and
determine that the triggering event for modifying the matrix has been detected, in response to at least one of: the new workload being added, the one or more requirements of the currently running workload being changed, the one of the respective workloads having completed, the new platform being added, the cost charged by the one of the respective platforms being changed, the one or more resources being changed, and the one of the respective platform being removed.

20. The computer program product of claim 11, wherein, based on information in the matrix, optimal placements of the respective workloads on the respective platforms are determined, wherein the respective workloads are placed on the respective platforms, based on the optimal placements.

* * * * *